United States Patent [19]

Ruhl

[11] 4,198,895

[45] Apr. 22, 1980

[54] FATIGUE PERFORMANCE COLLARS AND LOCKBOLT CONSTRUCTION

[75] Inventor: John H. Ruhl, Tustin, Calif.

[73] Assignee: Huck Manufacturing Company, Detroit, Mich.

[21] Appl. No.: 889,860

[22] Filed: Mar. 24, 1978

[51] Int. Cl.² .............................................. F16B 21/00
[52] U.S. Cl. .................................................... 85/7
[58] Field of Search ....................... 85/5 R, 7; 151/2 A

[56] References Cited

U.S. PATENT DOCUMENTS

| 2,531,049 | 11/1950 | Huck ........................................ 85/5 R |
| 2,955,505 | 10/1960 | Schuster ................................. 85/5 R |
| 3,057,246 | 10/1962 | Brilmyer ................................ 85/5 R |
| 3,094,017 | 6/1963 | Chapoux et al. ...................... 85/5 R |
| 3,203,300 | 8/1965 | Marschner ................................. 85/7 |
| 3,421,562 | 1/1969 | Orloff et al. .......................... 151/2 A |
| 3,560,124 | 2/1971 | Bergere ....................................... 85/7 |
| 3,792,933 | 2/1974 | Stencel ................................... 85/7 X |

FOREIGN PATENT DOCUMENTS 832637  2/1976  Belgium ........................................... 85/7

Primary Examiner—Thomas J. Holko
Attorney, Agent, or Firm—Harness, Dickey & Pierce

[57] ABSTRACT

An aircraft fastener element, as a collar or nut, designed and constructed to produce improved fatigue performance in low shear transfer joints. The improved collar or nut has a bearing surface which abuts against the adjacent surface of the workpiece aperture in an initial predetermined area so that when the collar is swaged or the nut tightened and compressed the initial annular base is flattened to no more than approximately 1.25 D (D being the internal diameter of the nut or collar).

3 Claims, 5 Drawing Figures

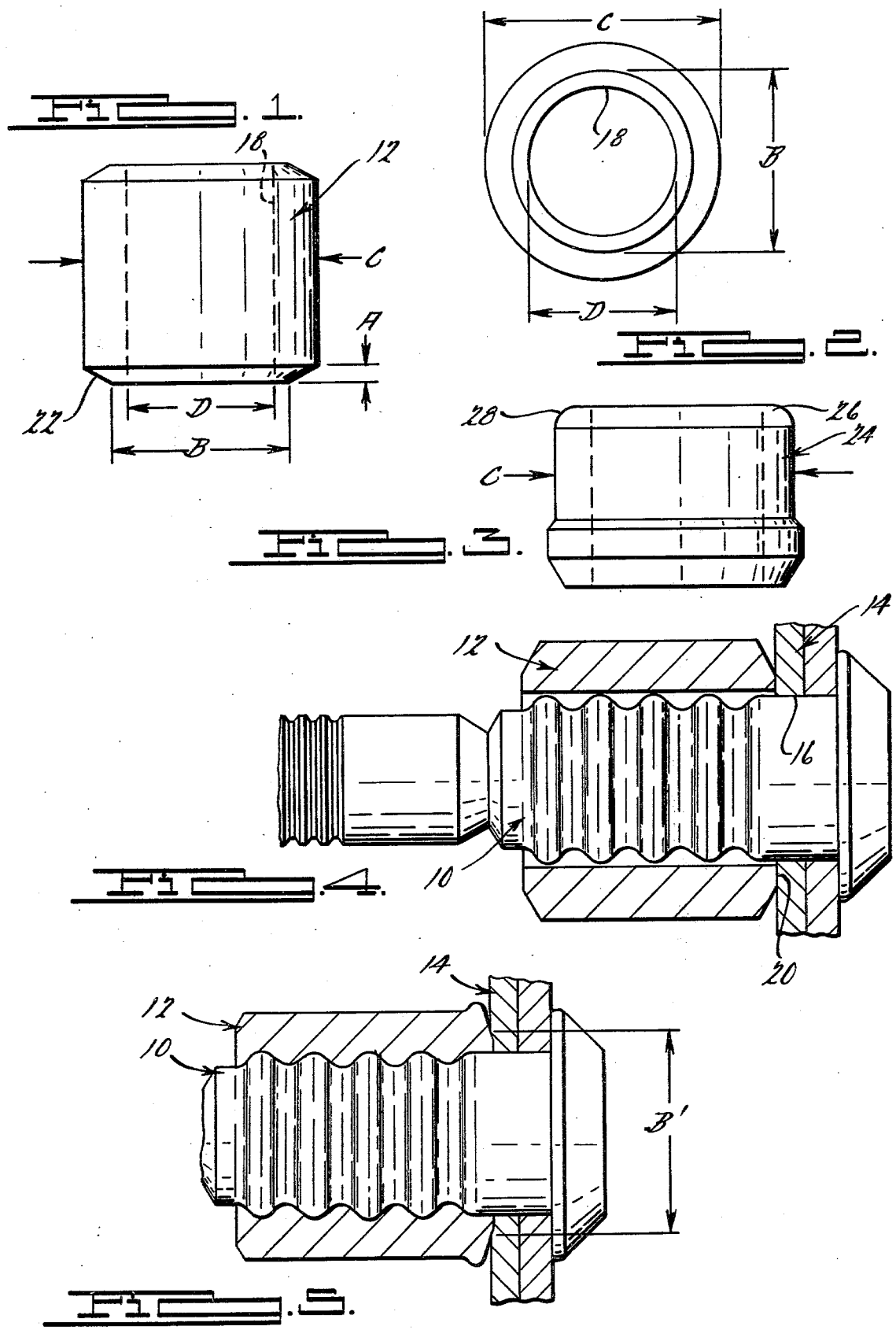

FATIGUE PERFORMANCE COLLARS AND LOCKBOLT CONSTRUCTION

BACKGROUND OF THE INVENTION

A low shear transfer joint in aero space structure is recognized and defined as a fatigue joint where less than twenty percent (20%) of the fastener shear strength is transferred during design limit loading. This type of joint is common to spanwise aircraft wing attachments, and longitudinal fusilage fasteners.

Evaluation of investigative data brings the conclusion fretting is the common failure mode between one hundred thousand and one million cycles for interference fit low shear transfer joints.

When the load transfer is very low the fretting failure mode is caused by fretting under the collar, nut, or fastener head. For the higher load transfer joints fastener shank fretting is sometimes a failure cause, but faying surface fretting is the primary failure mode.

Fretting is caused by a combination of the following factors:

1. Coefficient of friction between the mated components.
2. Bearing pressure between the mated components.
3. Relative motion between the mated components.

At the present time applicant does not know the exact interaction equation of these factors, but, by eliminating or changing one or more of these factors fretting failure can be controlled or eliminated. The factor chosen by applicant to control is the relative motion between the fastener and the joint material. In low shear transfer joints, as tension loads are applied to the joined material, specimen stretching occurs, while the fastener remains stationary. This causes relative fretting motion, and the fastener preloads adds to the fretting action.

The equation for relative motion between the fastener head, nut or collar and the joined material is:

$FM = (f_{JM}/E) \, d_{MAX}$ $E$ = Modulus of elasticity of joined material
$f_{JM}$ = Axial stress of joined material
$d_{MAX}$ = Maximum bearing diameter of the fastener
$FM$ = Fretting motion or elongation When the strain is between 0.002/0.004 in./in. and when the fastener bearing diameter is greater than 1.25 times the fastener shank diameter, fretting failure modes can take place. Since the strain cannot be controlled in the actual structure practically, the bearing diameter has been chosen for control. Fastener head, flush recess, nut and collar installed geometries therefore have been modified to produce bearing diameters of no greater than 1.25 times the fastener shank diameter. The above geometries are devised for fastener preloads which are in the typical range for shear pin and collar fasteners equal to approximately sixty percent (60%) of minimum tensile strength.

The equation for maximum bearing contact equal to 1.25 times the fastener diameter is:

$$A = \left[\left(\frac{1.25D}{2}\right)^2 - \left(\frac{D}{2}\right)^2\right]\pi$$

A = Maximum bearing area
D = Fastener shank diameter

The bearing stress that correlates to 1.25 maximum bearing diameter is:

$f_{BR} = 0.60 \, P_T/A$ $f_{BR}$ = Bearing stress
$P_T$ = Fastener preload
A = Maximum bearing area The 0.60 factor is the average pin and collar preload ratio to fastener minimum ultimate strength.

The bearing stresses using the above equations are well below the yield strengths of common collar/nut or sheet materials, so they indicate stable joints. In order to obtain the minimum bearing diameter contact desired from the nut/collar or fastener head, applicant has chosen a material yielding approach. This approach consists of creating an initial bearing area that is below the bearing area required to sustain yield bearing stresses, and then allowing the collar/nut or sheet material to yield until a stable bearing area is created.

This insures that the minimum bearing diameter is obtained for a given fastener preload condition.

The present application is related to applicant's application Ser. No. 501,872, filed Aug. 30, 1974 and now abandoned.

The state of the prior art is indicated by U.S. Pat. No. 3,094,017 of Champoux et al, U.S. Pat. No. 3,421,562 of Orloff et al and U.S. Pat. No. 2,531,049 of Orloff, the disclosures of which are incorporated herein by reference.

BRIEF DESCRIPTION OF DRAWINGS

FIG. 1 is a side elevational view of a fastener collar element embodying the present invention;

FIG. 2 is an end elevational view of the collar of FIG. 1;

FIG. 3 is a view similar to FIG. 1 of a modified version of the invention;

FIG. 4 is a cross-sectional and elevational view of the assembled collar and pin of the present invention before the fastener is set and the collar swaged;

FIG. 5 is a view similar to FIG. 4 showing the fastener finally set and its collar swaged.

DETAILED DESCRIPTION OF PREFERRED EMBODIMENTS

Referring to the drawings and referring particularly to FIGS. 4 and 5, a fastener of the present invention is illustrated in its assembled relationship to the workpiece. The invention is illustrated in connection with a fastener known as a lockbolt such as that described in U.S. Pat. No. 2,531,049. It comprises a pin generally indicated at 10, a collar generally indicated at 12 and a workpiece generally indicated at 14, having an aperture 16 therethrough. The pin 10 may be a conventional lockbolt pin having lock grooves, a break neck, pull grooves at one end and a head at the opposite end. The pin is positioned through the work aperture 16 and the collar 12 is disposed over the pin so that the leading face of the collar 12 abuts the adjacent face of the workpiece 14 around the aperture 16.

In FIG. 4 the fastener assembly is illustrated before the fastener is set, or the collar 12 swaged in the manner disclosed in U.S. Pat. No. 2,531,049. The fastener is illustrated in FIG. 5 after the fastener has been set, the collar swaged and the pin broken off at the break neck.

The description thus far is that of the conventional lockbolt in the patent referred to.

According to the present invention the collar 12 is specially designed and constructed for the purposes set forth above. Such collar is also shown in FIGS. 1 and 2 and in this embodiment is the type known as a double ended collar. That is, opposite ends of the collar are of the same design and construction so that the collar may be applied to the work on the pin in either direction.

Such collar 12 has a smooth internal bore 18 which conforms to that of the diameter of the pin 10 with which it is to be used. The internal diameter of the bore is indicated at D.

The external diameter of the collar is indicated at C.

Both end faces of the collar 12 are identical. Each end face is formed with a flat surface defined by diameter B and the area defined by this diameter as indicated at 20 in FIG. 4 bears against the adjacent face of the workpiece. The end faces of the collar terminate in tapers 22, the longitudinal dimension or height being indicated at A.

As discussed above under the Background of the Invention, the area 20 before and after swage is critical. The area 20 expands during swage so that when the fastener is set the dimension B has been enlarged to $B^1$ as shown in FIG. 5.

These critical dimensions, in order to accomplish the purposes described above are equated in the following way. With D representing the internal diameter of the collar, B equals 1.20 D maximum, A equals 0.12 D minimum and C equals 1.6 D maximum.

When the fastener is driven $B^1$, or the diameter of the bearing surface after swage (see FIG. 5), equals 1.25 D. It is this dimension that as pointed out above assures the increased fatigue life of the joint. During the swaging the engagement of the bearing surfaces of the collar defined by dimension B and after swage by the dimension $B^1$ results in stress coining the area of the workpiece around the aperture.

FIG. 3 represents a modified form of collar generally indicated at 24. This collar is generally of the type shown in the Orloff U.S. Pat. No. 2,531,049 and is constructed with the same dimension relationship as above described with respect to the collar of FIGS. 1 and 2. It is a single ended collar in the sense that it must be put on properly in one direction so that the surface 26 is in position to bear against the workpiece. Instead of having a flat, uniform taper 22, the end of the collar is slightly rounded as indicated at 28. Otherwise, the dimensional relationships and functions are the same as in FIGS. 1 and 2.

Orloff U.S. Pat. No. 3,421,562 discloses a different type of fastener in which a nut is threaded to a pin and thereafter swaged in the final setting of the fastener. The present invention is also contemplated with the nut of the type shown in that patent so that the bearing end would be constructed and dimensioned according to the equations set forth above with the same beneficial results.

I claim:

1. A fastener construction comprising a fastener pin having a head and a shank portion positioned through a work piece aperture, a collar or nut having an outer diameter C, a central opening having an internal diameter D embracing said shank with the leading surface of said collar or nut comprising a substantially flat surface having an outside diameter B and a tapered portion from said flat surface to said outer diameter C, said tapered portion having an axial height A, said leading surface bearing against the adjacent surface of the workpiece around the workpiece aperture, said collar being constructed according to the following equations:

with D representing the internal diameter of the collar opening, the maximum B dimension is substantially equal to 1.20 D, the minimum A dimension is substantially equal to 0.12 D and the the maximum C dimension of the collar is substantially equal to 1.6 D; these equations being those with the collar before swaging.

2. A fastener construction according to claim 1 in which the maximum bearing contact of the collar or nut with the maximum B dimension subsequent to setting said fastener being approximately equal to 1.25 D is:

$$A = \left[\left(\frac{1.25D}{2}\right)^2 - \left(\frac{D}{2}\right)^2\right]\pi$$

3. A fastener construction comprising a fastener pin having a head and a shank portion positioned through a workpiece aperture, a collar or nut having an outer diameter C, a central opening having an internal diameter D embracing said shank with the leading surface of said collar or nut comprising a substantially flat surface having an outside diameter B and a tapered portion from said flat surface to said outer diameter C, said tapered portion having an axial height A, said leading surface bearing against the adjacent surface of the workpiece around the workpiece aperture, said collar being constructed according to the following equations:

with D representing the internal diameter of the collar opening, the maximum B dimension before setting of said fastener is substantially equal to 1.20 D, the minimum A dimension before setting of said fastener is substantially equal to 0.12 D and the maximum C dimension of the collar before setting said fastener is substantially equal to 1.6 D, and said maximum B dimension subsequent to setting of said fastener being no greater than 1.25 D.

* * * * *